(12) United States Patent
Liu

(10) Patent No.: US 11,733,735 B2
(45) Date of Patent: Aug. 22, 2023

(54) SUPPORT ASSEMBLY, FOLDABLE DISPLAY SCREEN AND TERMINAL DEVICE

(71) Applicant: BEIJING XIAOMI MOBILE SOFTWARE CO., LTD., Beijing (CN)

(72) Inventor: Jianwei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/677,595

(22) Filed: Feb. 22, 2022

(65) Prior Publication Data
US 2023/0152855 A1     May 18, 2023

(30) Foreign Application Priority Data
Nov. 16, 2021   (CN) .......................... 202111356835.7

(51) Int. Cl.
*G06F 1/16*     (2006.01)
(52) U.S. Cl.
CPC .......... *G06F 1/1652* (2013.01); *G06F 1/1675* (2013.01); *G06F 1/1681* (2013.01)
(58) Field of Classification Search
CPC .............................. G06F 1/1652; G06F 1/1681
See application file for complete search history.

(56) References Cited

U.S. PATENT DOCUMENTS

| | | | | |
|---|---|---|---|---|
| 4,611,710 A * | 9/1986 | Mitsufuji | ............... | B65G 17/08 198/853 |
| 6,223,393 B1 * | 5/2001 | Knopf | ................... | G06F 1/1618 16/386 |
| 6,421,235 B2 * | 7/2002 | Ditzik | ..................... | G06F 1/166 361/679.3 |
| 8,804,324 B2 * | 8/2014 | Bohn | .................. | H04M 1/0216 361/679.55 |
| 9,047,055 B2 * | 6/2015 | Song | ..................... | G06F 1/1652 |
| 9,268,372 B1 * | 2/2016 | Hsu | ........................ | G06F 1/1681 |

(Continued)

FOREIGN PATENT DOCUMENTS

| | | |
|---|---|---|
| CN | 110730257 A | 1/2020 |
| EP | 2874043 A1 | 5/2015 |

OTHER PUBLICATIONS

European Patent Application No. 22158876.7, Search and Opinion dated Aug. 16, 2022, 9 pages.

*Primary Examiner* — Adrian S Wilson
(74) *Attorney, Agent, or Firm* — Cozen O'Connor

(57) ABSTRACT

A support assembly, a foldable display screen and a terminal device are provided. The support assembly includes a first support member, a second support member and a third support member. The second support member has a first side and a second side. The first support member is rotatably arranged to the first side of the second support member, and the third support member is rotatably arranged to the second side of the second support member. The first support member is movable between a first locked position and a first unlocked position. The first support member is configured to rotate relative to the second support member, and the second support member and the third support member are configured to be fixed relative to each other when the first support member is in the first locked position. The second support member is configured to rotate relative to the third support member when the first support member is in the first unlocked position.

20 Claims, 5 Drawing Sheets

(56) References Cited

U.S. PATENT DOCUMENTS

| | | | |
|---|---|---|---|
| 9,471,111 B2* | 10/2016 | Huang | E05D 7/06 |
| 9,625,947 B2* | 4/2017 | Lee | G06F 1/1616 |
| 9,625,954 B2* | 4/2017 | Campbell | E05D 11/0054 |
| 9,870,031 B2* | 1/2018 | Hsu | G06F 1/1681 |
| 9,946,310 B1* | 4/2018 | Huang | G06F 1/1681 |
| 9,992,888 B2* | 6/2018 | Moon | G06F 1/1652 |
| 10,037,058 B2* | 7/2018 | Kato | E05D 3/06 |
| 10,067,530 B2* | 9/2018 | Tazbaz | E05D 11/10 |
| 10,114,424 B2* | 10/2018 | Campbell | E05D 11/0081 |
| 10,120,415 B2* | 11/2018 | Seo | G06F 1/1652 |
| 10,143,098 B1* | 11/2018 | Lee | E05D 11/06 |
| 10,162,389 B2* | 12/2018 | Tazbaz | H04M 1/022 |
| 10,174,534 B2* | 1/2019 | Tazbaz | G06F 1/1616 |
| 10,231,347 B2* | 3/2019 | Seo | G06F 1/1681 |
| 10,684,657 B2* | 6/2020 | Lin | G06F 1/1616 |
| 11,442,510 B2* | 9/2022 | Li | G06F 1/1677 |
| 2007/0117600 A1* | 5/2007 | Robertson, Jr. | G06F 1/1681 455/575.1 |
| 2007/0247799 A1* | 10/2007 | Nie | G06F 1/1635 361/679.55 |
| 2010/0232100 A1* | 9/2010 | Fukuma | H04M 1/0216 361/679.01 |
| 2011/0051326 A1* | 3/2011 | Chen | G06F 1/1681 361/679.01 |
| 2013/0135809 A1* | 5/2013 | Uchiyama | G06F 1/1618 16/371 |
| 2013/0216740 A1* | 8/2013 | Russell-Clarke | G06F 1/1616 219/121.72 |
| 2013/0219663 A1* | 8/2013 | Cai | G06F 1/1681 16/371 |
| 2014/0126133 A1* | 5/2014 | Griffin | G06F 1/1652 312/326 |
| 2014/0174226 A1* | 6/2014 | Hsu | E05D 3/122 74/98 |
| 2014/0196253 A1* | 7/2014 | Song | G06F 1/1681 16/225 |
| 2014/0196254 A1* | 7/2014 | Song | G06F 1/1652 16/302 |
| 2014/0217875 A1* | 8/2014 | Park | H05K 5/0226 16/354 |
| 2015/0176317 A1* | 6/2015 | Lee | E05D 3/06 16/251 |
| 2015/0277506 A1* | 10/2015 | Cheah | E05D 11/0081 361/679.28 |
| 2016/0132075 A1* | 5/2016 | Tazbaz | H04M 1/0216 361/679.27 |
| 2016/0132076 A1* | 5/2016 | Bitz | G06F 1/1616 361/679.02 |
| 2016/0139634 A1* | 5/2016 | Cho | G06F 1/1652 16/366 |
| 2016/0147267 A1* | 5/2016 | Campbell | E05D 3/06 16/369 |
| 2016/0187935 A1* | 6/2016 | Tazbaz | H04M 1/0216 361/679.55 |
| 2016/0215541 A1* | 7/2016 | Tazbaz | E05D 7/00 |
| 2016/0224072 A1* | 8/2016 | Huang | G06F 1/1681 |
| 2016/0357226 A1* | 12/2016 | Campbell | E05D 3/06 |
| 2017/0090523 A1* | 3/2017 | Tazbaz | G06F 1/1654 |
| 2018/0044958 A1* | 2/2018 | Tazbaz | E05D 3/12 |
| 2018/0049329 A1* | 2/2018 | Seo | H05K 5/0221 |
| 2018/0059735 A1* | 3/2018 | Tazbaz | G06F 1/1677 |
| 2018/0059740 A1* | 3/2018 | Kato | G06F 1/1681 |
| 2018/0067519 A1* | 3/2018 | Tazbaz | E05D 11/10 |
| 2018/0088634 A1* | 3/2018 | Bitz | E05D 3/06 |
| 2019/0034143 A1* | 1/2019 | Wu | G06F 3/14 |
| 2021/0050698 A1 | 2/2021 | Tian | |

\* cited by examiner

SUPPORT ASSEMBLY, FOLDABLE DISPLAY SCREEN AND TERMINAL DEVICE

CROSS-REFERENCE TO RELATED APPLICATION

This application is based on and claims priority to Chinese Patent Application No. 202111356835.7, filed on Nov. 16, 2021, the entire content of which is incorporated herein by reference.

BACKGROUND

With ongoing development of electronic products, a foldable display screen is widely used in a terminal device to provide a larger screen area while maintaining a more compact device size. For example, the foldable display screen may be used in a mobile phone or in a computer, etc. For a terminal device which is foldable in form, an assembly to provide support for the display screen is essential, and the performance of a hinge used when folding the display screen may directly affect functions and user experience of the terminal device. In the related art, the support assembly of the foldable display screen needs to be provided with linkage and synchronization structure, which is not conducive to a lightweight design of the terminal device.

SUMMARY

The present disclosure relates to a field of foldable screens, and more particularly to a support assembly, a foldable display screen and a terminal device.

Embodiments of a first aspect of the present disclosure provide a support assembly.

The support assembly according to the embodiments of the present disclosure includes a first support member, a second support member and a third support member. The second support member has a first side and a second side. The first support member is rotatably arranged to the first side of the second support member, and the third support member is rotatably arranged to the second side of the second support member. The first support member is movable between a first locked position and a first unlocked position. The first support member is configured to rotate relative to the second support member, and the second support member and the third support member are configured to be fixed relative to each other when the first support member is in the first locked position. The second support member is configured to rotate relative to the third support member when the first support member is in the first unlocked position.

Embodiments of a second aspect of the present disclosure further provide a foldable display screen.

The foldable display screen according to the embodiments of the present disclosure includes a display panel and a support assembly, and at least a part of the display panel is arranged on the support assembly. The support assembly includes a first support member, a second support member and a third support member. The second support member has a first side and a second side. The first support member is rotatably arranged to the first side of the second support member, and the third support member is rotatably arranged to the second side of the second support member. The first support member is movable between a first locked position and a first unlocked position. The first support member is configured to rotate relative to the second support member, and the second support member and the third support member are configured to be fixed relative to each other when the first support member is in the first locked position. The second support member is configured to rotate relative to the third support member when the first support member is in the first unlocked position.

Embodiments of a third aspect of the present disclosure further provide a terminal device.

The terminal device according to embodiments of the present disclosure includes: a housing; and a foldable display screen arranged to the housing. The foldable display screen includes a display panel and a support assembly, and at least a part of the display panel is arranged on the support assembly. The support assembly includes a first support member, a second support member and a third support member. The second support member has a first side and a second side. The first support member is rotatably arranged to the first side of the second support member, and the third support member is rotatably arranged to the second side of the second support member. The first support member is movable between a first locked position and a first unlocked position. The first support member is configured to rotate relative to the second support member, and the second support member and the third support member are configured to be fixed relative to each other when the first support member is in the first locked position. The second support member is configured to rotate relative to the third support member when the first support member is in the first unlocked position.

DETAILED DESCRIPTION

Figure 1:
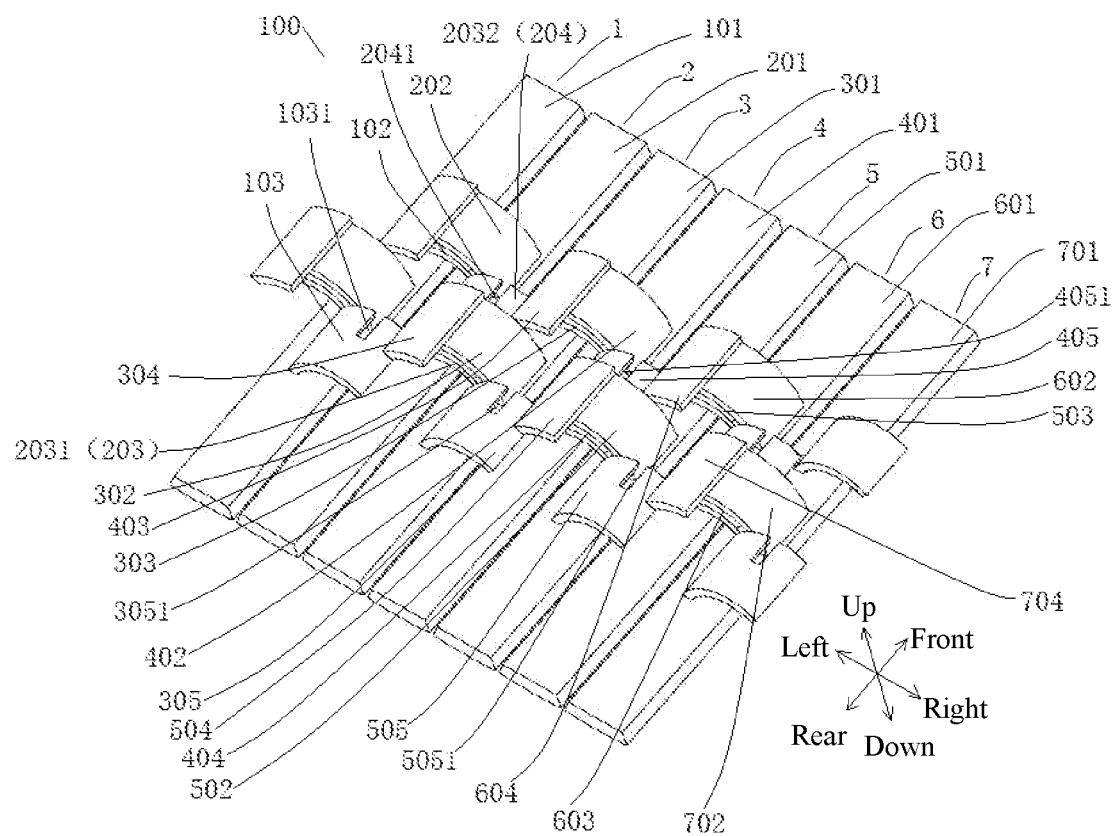
FIG. 1 is a schematic view of a support assembly in a first state according to an embodiment of the present disclosure.

Embodiments of the present disclosure are described in detail below, and examples of the embodiments are shown in the accompanying drawings. The embodiments described below with reference to the accompanying drawings are exemplary, are merely used to explain the present disclosure, and cannot be construed to limit the present disclosure.

In a related art, a terminal device with a foldable display screen includes a plurality of support plates, and linkage and synchronization structures need to be between the respective support plates. On one hand, the existence of the linkage and synchronization structures causes much internal space of the terminal device to be occupied by the foldable display screen, thereby resulting in a large thickness of the terminal device. On the other hand, the linkage and synchronization structures increase a weight of the foldable display screen, thereby resulting in a relatively large weight of the terminal device. In addition, in order to reduce the number of the linkage and synchronization structures and hence reduce the weight of the terminal device, the number of the support plates is often set to be small, thereby resulting in a poor support effect for a display panel of the foldable display screen.

Embodiments of the present disclosure provide a support assembly with a small size and a light weight.

Embodiments of the present disclosure further provide a foldable display screen with a thin thickness and a light weight.

Embodiments of the present disclosure further provide a terminal device with a thin thickness and a light weight.

The support assembly according to the embodiments of the present disclosure includes a first support member, a second support member and a third support member. The first support member is rotatably arranged to one side of the second support member, and the third support member is rotatably arranged to the other side of the second support member. The first support member is movable between a first locked position and a first unlocked position. When the first support member is in the first locked position, the first support member is configured to rotate relative to the second support member, and the second support member and the third support member are fixed relative to each other. When the first support member is in the first unlocked position, the second support member is configured to rotate relative to the third support member.

The support assembly of the embodiments of the present disclosure only needs to form rotation pairs between the first support member and the second support member and between the second support member and the third support member, so as to achieve the rotation of the first support member relative to the second support member and the rotation of the second support member relative to the third support member. Further, a stop structure is arranged among the first support member, the second support member and the third support member, such that when the first support member is in the first locked position, the first support member can rotate relative to the second support member, and the second support member and the third support member are fixed relative to each other, and such that when the first support member is in the first unlocked position, the second support member can rotate relative to the third support member, without providing the linkage and synchronization structures between the respective support members. Compared to the related art, a size and a weight of the support assembly are greatly reduced, such that a thickness and a weight of the foldable display screen can be reduced, and further, a thickness and a weight of the terminal device with the foldable display screen can be reduced, which is conducive to a lightweight design of the terminal device with the foldable display screen.

In some embodiments, the support assembly further includes a fourth support member rotatably arranged to a side of the third support member away from the second support member. When the first support member is in the first locked position, the third support member and the fourth support member are fixed relative to each other. The second support member is movable between a second locked position and a second unlocked position. When the second support member is in the second locked position, the first support member is in the first unlocked position, and the third support member and the fourth support member are fixed relative to each other. When the second support member is in the second unlocked position, the third support member is configured to rotate relative to the fourth support member.

In some embodiments, the first support member includes a first support body and a first fitting portion arranged on the first support body, the second support member includes a second support body and a second fitting portion arranged on the second support body, and the second fitting portion is rotatably arranged to the first fitting portion such that the first support member is rotatably arranged to the second support member; and/or the second support member includes a second support body and a third fitting portion arranged on the second support body, the third support member includes a third support body and a fourth fitting portion arranged on the third support body, and the fourth fitting portion is rotatably arranged to the third fitting portion such that the third support member is rotatably arranged to the second support member.

In some embodiments, the first fitting portion overhangs an edge of the first support body along a direction towards the second support body, and the second fitting portion overhangs an edge of the second support body along a direction towards the first support body; and/or the third fitting portion overhangs an edge of the second support body along a direction towards the third support body, and the fourth fitting portion overhangs an edge of the third support body along a direction towards the second support body.

In some embodiments, one of the first fitting portion and the second fitting portion is a first sliding block, the other one of the first fitting portion and the second fitting portion is a first sliding piece, the first sliding block is provided with a first sliding slot having an opening facing the first sliding piece, and a part of the first sliding piece is slidably arranged in the first sliding slot along an arrangement direction of the first support body and the second support body through the opening of the first sliding slot; and/or one of the third fitting portion and the fourth fitting portion is a second sliding block, the other one of the third fitting portion and the fourth fitting portion is a second sliding piece, the second sliding block is provided with a second sliding slot having an opening facing the second sliding piece, and a part of the second sliding piece is slidably arranged in the second sliding slot along an arrangement direction of the second support body and the third support body through the opening of the second sliding slot.

In some embodiments, the first sliding piece is an arc sliding piece, and the first sliding piece is fitted with the first sliding slot; and/or the second sliding piece is an arc sliding piece, and the second sliding piece is fitted with the second sliding slot.

In some embodiments, the third support member includes a fifth fitting portion arranged on the third support body, the fourth support member includes a fourth support body and a sixth fitting portion arranged on the fourth support body, the sixth fitting portion is rotatably arranged to the fifth fitting portion such that the fourth support member is rotatably arranged to the third support member.

In some embodiments, the fifth fitting portion overhangs an edge of the third support body along a direction towards the fourth support body, and the sixth fitting portion overhangs an edge of the fourth support body along a direction towards the third support body.

In some embodiments, one of the fifth fitting portion and the sixth fitting portion is a third sliding block, the other one of the fifth fitting portion and the sixth fitting portion is a third sliding piece, the third sliding block is provided with a third sliding slot having an opening facing the third sliding piece, and a part of the third sliding piece is slidably arranged in the third sliding slot along an arrangement direction of the third support body and the fourth support body through the opening of the third sliding slot.

In some embodiments, the third sliding piece is an arc sliding piece, and the third sliding piece is fitted with the third sliding slot.

In some embodiments, the first support member includes a first stop portion arranged on the first support body, and the third support member includes a second stop portion arranged on the third support body. When the first support member is in the first locked position, the first stop portion and the second support member are spaced apart from each other such that the first support member is configured to rotate relative to the second support member, and one of the first stop portion and the second stop portion is configured to abut against the other one of the first stop portion and the second stop portion such that the second support member and the third support member are fixed relative to each other. When the first support member is in the first unlocked position, the second stop portion disengages from the first stop portion such that the second support member is configured to rotate relative to the third support member.

In some embodiments, the first stop portion overhangs an edge of the first support body along a direction towards the third support body, and the second stop portion overhangs an edge of the third support body along a direction towards the first support body.

In some embodiments, one of the first stop portion and the second stop portion is a first stop piece, the first stop piece is provided with a first relief notch, and the other one of the first stop portion and the second stop portion is a first stop block. When the first support member is in the first locked position, the first stop block is configured to abut against the first stop piece. When the first support member is in the first unlocked position, the first stop block is located in the first relief notch, such that the second stop portion disengages from the first stop portion.

In some embodiments, the second support member includes a third stop portion arranged on the second support body, and the fourth support member includes a fourth stop portion arranged on the fourth support body. When the second support member is in the second locked position, the third stop portion and the third support member are spaced apart from each other such that the second support member is configured to rotate relative to the third support member, and one of the third stop portion and the fourth stop portion is configured to abut against the other one of the third stop portion and the fourth stop portion such that the third support member and the fourth support member are fixed relative to each other. When the second support member is in the second unlocked position, the fourth stop portion disengages from the third stop portion such that the third support member is configured to rotate relative to the fourth support member.

In some embodiments, the third stop portion overhangs an edge of the second support body along a direction towards the fourth support body, and the fourth stop portion overhangs an edge of the fourth support body along a direction towards the second support body.

In some embodiments, one of the third stop portion and the fourth stop portion is a second stop piece, the second stop piece is provided with a second relief notch, and the other one of the third stop portion and the fourth stop portion is a second stop block. When the second support member is in the second locked position, the second stop block is configured to abut against the second stop piece. When the second support member is in the second unlocked position, the second stop block is located in the second relief notch, such that the fourth stop portion disengages from the third stop portion.

In some embodiments, the third fitting portion is the second sliding piece, the third stop portion is the second stop piece, and the second sliding piece is provided with the second stop piece. The second sliding piece includes a fitting section and a stop section connected with each other, a part of the fitting section is slidably arranged in the second sliding slot along the arrangement direction of the second support body and the third support body, and the second relief notch is formed in the stop section. When the second support member is in the second locked position, the second stop block is configured to abut against the stop section.

In some embodiments, the first support body, the second support body and the third support body are arranged along a width direction of the first support body, the first fitting portion and the first stop portion are spaced apart from each other along a length direction of the first support body, and the third fitting portion is located between the first fitting portion and the first stop portion in the length direction of the first support body; and/or the third support body and the fourth support body are arranged along a width direction of the first support body, the sixth fitting portion and the first stop portion are spaced apart from each other along the length direction of the first support body, and the third fitting portion is located between the sixth fitting portion and the first stop portion in the length direction of the first support body.

In some embodiments, the second stop portion is arranged on the fourth fitting portion; and/or the fourth stop portion is arranged on the sixth fitting portion.

In some embodiments, the second stop portion and the fourth fitting portion are integrally formed; and/or the fourth stop portion and the sixth fitting portion are integrally formed.

In some embodiments, the second stop portion overhangs an edge of the fourth fitting portion along the length direction of the first support body; and/or the fourth stop portion overhangs an edge of the sixth fitting portion along the length direction of the first support body.

In some embodiments, when the first support member is in the first unlocked position, the first stop portion abuts against the second support body such that the first support member and the second support member are fixed relative to each other.

In some embodiments, when the second support member is in the second unlocked position, the third stop portion abuts against the third support member such that the second support member and the third support member are fixed relative to each other.

In some embodiments, wherein the structures of the first support member and the third support member are identical, and the structures of the second support member and the fourth support member are identical.

The foldable display screen of the embodiments of the present disclosure includes a display panel and a support assembly, and at least a part of the display panel is arranged on the support assembly.

Specifically, the support assembly is arranged at a side of the display panel where no image is displayed. The entire display panel may be arranged on the support assembly, such that the support assembly is used to support the display panel, and the support assembly is further used to achieve the folding of the display panel. Of course, only a part of the display panel may also be arranged on the support assembly, such that the support assembly is used to support the part of the display panel, and the support assembly is further used to achieve the folding of the part of the display panel.

The foldable display screen according to the embodiments of the present disclosure has advantages of a thin thickness, a light weight and the like.

The terminal device according to embodiments of the present disclosure includes: a housing; and the foldable display screen according to any one of the above embodiments. The foldable display screen is arranged to the housing.

The terminal device according to the embodiments of the present disclosure has advantages of a thin thickness, a light weight and the like.

The foldable display screen may be a display screen of a mobile phone, a tablet computer or another terminal device. The display panel is a bendable and flexible display panel.

The support assembly of the embodiments of the present disclosure is described below with reference to the accompanying drawings.

As shown in FIGS. 1 to 5, the support assembly 100 according to the embodiments of the present disclosure includes a first support member 1, a second support member 2 and a third support member 3. The first support member 1 is rotatably arranged to one side of the second support member 2, and the third support member 3 is rotatably arranged to the other side of the second support member 2. The first support member 1 is movable between a first locked position and a first unlocked position. When the first support member 1 is in the first locked position, the first support member 1 can rotate relative to the second support member 2, and the second support member 2 and the third support member 3 are fixed relative to each other. When the first support member 1 is in the first unlocked position, the second support member 2 can rotate relative to the third support member 3.

The first support member 1 being configured to rotate relative to the second support member 2, may be understood as follows: when the display panel needs to be folded, the first support member 1 rotates relative to the second support member 2; when the display panel doesn't need to be folded, the first support member 1 may rotate relative to the second support member 2, or the first support member 1 may also not rotate relative to the second support member 2.

The second support member 2 being configured to rotate relative to the third support member 3, may be understood as follows: when the display panel needs to be folded, the second support member 2 rotates relative to the third support member 3; when the display panel doesn't need to be folded, the second support member 2 may rotate relative to the third support member 3, or the second support member 2 may also be fixed relative to the third support member 3.

In order to more easily understand the technical solution of the present disclosure, the technical solution of the present disclosure is further described by taking an example below, in which arrangement directions of the first support member 1 and the second support member 2 are consistent with a left-right direction, and a rotation axis of the first support member 1 is consistent with a front-rear direction. A set of coordinates showing the left-right direction and the front-rear direction referenced herein are shown in FIGS. 1 to 4.

Figure 2:
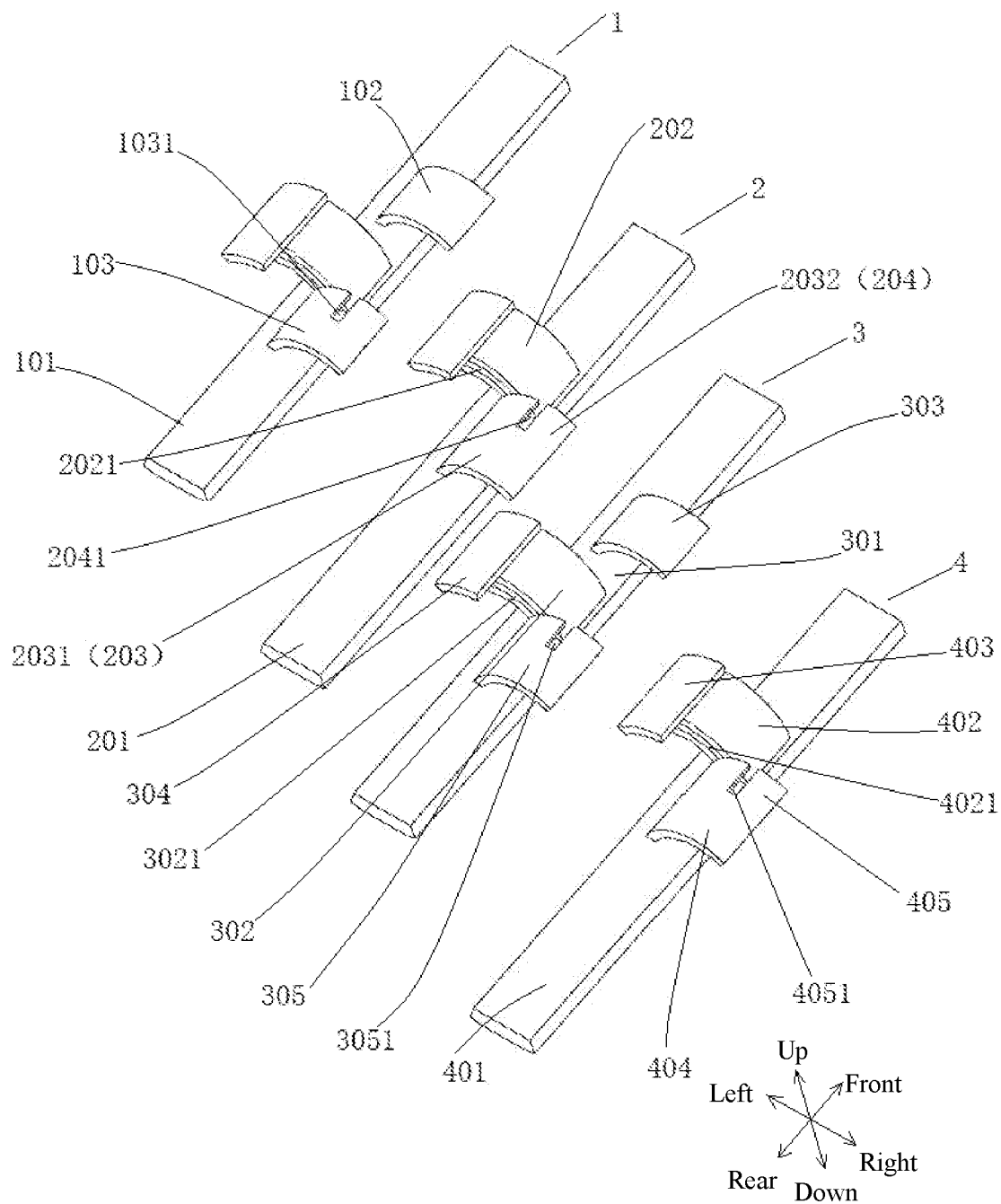
FIG. 2 is a schematic view of a first support member, a second support member, a third support member and a fourth support member in FIG. 1.

For example, as shown in FIGS. 1 and 2, the first support member 1 is rotatably arranged to a left side of the second support member 2, and the third support member 3 is rotatably arranged to a right side of the second support member 2. The first support member 1 has a first rotation axis extending along the front-rear direction, and the second support member 2 has a second rotation axis extending along the front-rear direction. When the first support member 1 is in a first locked position, the first support member 1 can rotate around the first rotation axis relative to the second support member 2. When the first support member 1 is in a first unlocked position, the second support member 2 can rotate around the second rotation axis relative to the third support member 3.

The foldable display screen according to the embodiments of the present disclosure has a following use process.

When the foldable display screen needs to be bent and folded, first, the first support member 1 is in the first locked position, and the first support member 1 rotates relative to the second support member 2 around the first rotation axis by a first preset angle, such that a part of the display panel corresponding to the first support member 1 is bent and folded by the first preset angle. In this case, the second support member 2 and the third support member 3 are fixed relative to each other, and corresponding parts of the display panel (a part corresponding to the second support member 2 and a part corresponding to the third support member 3) are stably supported by the second support member 2 and the third support member 3. Then, the first support member 1 is moved to the first unlocked position, and the second support member 2 rotates relative to the third support member 3 around the second rotation axis by a second preset angle, such that the part of the display panel corresponding to the second support member 2 is bent and folded by the second preset angle which may be equal to the first preset angle, and the second support member 2 is configured to drive the part of the display panel corresponding to the first support member 1 to be bent and folded by the second preset angle relative to the third support member 3, such that the part of the display panel corresponding to the first support member 1 is bent and folded by the sum of the first preset angle and the second preset angle relative to the third support member 3. Finally, the folding of at least part of the foldable display screen is completed.

When the foldable display screen needs to be unfolded, first, the first support member 1 is in the first unlocked position, and the second support member 2 rotates relative to the third support member 3 around the second rotation axis by the second preset angle, such that the part of the display panel corresponding to the second support member 2 is unfolded, and the second support member 2 is configured to drive the part of the display panel corresponding to the first support member 1 to rotate relative to the third support member 3 by the second preset angle. Then, the first support member 1 is moved to the first locked position, such that the second support member 2 and the third support member 3 are fixed relative to each other, and the corresponding parts of the display panel (the part corresponding to the second support member 2 and the part corresponding to the third support member 3) are stably supported by the second support member 2 and the third support member 3. Moreover, the first support member 1 rotates relative to the second support member 2 around the first rotation axis by the first preset angle, such that the part of the display panel corresponding to the first support member 1 is unfolded. Finally, the unfolding of at least part of the foldable display screen is completed.

The support assembly 100 of the embodiments of the present disclosure only needs to form rotation pairs between the first support member 1 and the second support member 2 and between the second support member 2 and the third support member 3, so as to achieve the rotation of the first support member 1 relative to the second support member 2 and the rotation of the second support member 2 relative to the third support member 3. Further, a stop structure is arranged among the first support member 1, the second support member 2 and the third support member 3, such that when the first support member 1 is in the first locked position, the first support member 1 can rotate relative to the second support member 2, and the second support member 2 and the third support member 3 are fixed relative to each other, and such that when the first support member 1 is in the first unlocked position, the second support member 2 can rotate relative to the third support member 3, without providing the linkage and synchronization structures between the respective support members. Compared to the related art, a size and a weight of the support assembly 100 are greatly reduced, such that a thickness and a weight of the foldable display screen can be reduced, and further, a thickness and a weight of the terminal device with the foldable display screen can be reduced, which is conducive to a lightweight design of the terminal device with the foldable display screen.

Thus, the support assembly 100 of the embodiments of the present disclosure has advantages of a small size and a light weight. Therefore, the foldable display screen with the support assembly 100 of the embodiments of the present disclosure also has advantages of a small size and a light weight.

In addition, after the size and weight of the support assembly are reduced, the number of the support members may be appropriately increased, such that the support assembly may better support the display panel, which is used to improve the user experience.

In some embodiments, as shown in FIGS. 1 to 5, the support assembly 100 also includes a fourth support member 4 rotatably arranged to a side of the third support member 3 away from the second support member 2. When the first support member 1 is in the first locked position, the third support member 3 is fixed relative to the fourth support member 4.

The second support member 2 is movable between a second locked position and a second unlocked position. When the second support member 2 is in the second locked position, the first support member 1 is in the first unlocked position, and the third support member 3 and the fourth support member 4 are fixed relative to each other. When the second support member 2 is in the second unlocked position, the third support member 3 can rotate relative to the fourth support member 4.

The third support member 3 being configured to rotate relative to the fourth support member 4, may be understood as follows: when the display panel needs to be folded, the third support member 3 rotates relative to the fourth support member 4; when the display panel does not need to be folded, the third support member 3 may rotate relative to the fourth support member 4, or the third support member 3 may also be fixed relative to the fourth support member 4.

As shown in FIGS. 1 and 2, the fourth support member 4 is rotatably arranged to a right side of the third support member 3. The third support member 3 has a third rotation axis extending along the front-rear direction. When the second support member 2 is in the second locked position, the first support member 1 is in the first unlocked position, and the second support member 2 can rotate relative to the third support member 3 around the second rotation axis. When the second support member 2 is in the second unlocked position, the third support member 3 can rotate around the third rotation axis relative to the fourth support member 4.

When the foldable display screen needs to be bent and folded, first, the first support member 1 is in the first locked position, such that the part of the display panel corresponding to the first support member 1 is bent and folded by the first preset angle. In this case, the second support member 2 and the third support member 3 as well as the third support member 3 and the fourth support member 4 are fixed relative to each other, and the corresponding parts of the display panel (the part corresponding to the second support member 2, the part corresponding to the third support member 3 and a part corresponding to the fourth support member 4) are stably supported by the second support member 2, the third support member 3 and the fourth support member 4.

Then, the second support member 2 is moved to the second locked position, and the first support member 1 is in the first unlocked position in this case, such that the part of the display panel corresponding to the second support member 2 is bent and folded by the second preset angle, and the second support member 2 drives the part of the display panel corresponding to the first support member 1 to be bent and folded relative to the third support member by the sum of the first preset angle and the second preset angle. In this case, the third support member 3 and the fourth support member 4 are fixed relative to each other, and the corresponding parts of the display panel (the part corresponding to the third support member 3 and the part corresponding to the fourth support member 4) are stably supported by the third support member 3 and the fourth support member 4.

Subsequently, the second support member 2 is moved to the second unlocked position, and the third support member 3 rotates relative to the fourth support member 4 around the third rotation axis by a third preset angle which may be equal to the first preset angle, such that the part of the display panel corresponding to the third support member 3 is bent and folded by the third preset angle. Further, the third support member 3 is configured to drive the part of the display panel corresponding to the second support member 2 to be bent and folded relative to the fourth support member 4 by the third preset angle, such that the part of the display panel corresponding to the second support member 2 is bent and folded relative to the fourth support member 4 by the sum of the second preset angle and the third preset angle. Moreover, the third support member 3 is configured to drive the part of the display panel corresponding to the first support member 1 to be bent and folded by the third preset angle relative to the fourth support member 4, such that the part of the display panel corresponding to the first support member 1 is bent and folded relative to the fourth support member 4 by the sum of the first preset angle, the second preset angle and the third preset angle. Finally, the folding of at least part of the foldable display screen is completed.

When the foldable display screen needs to be unfolded, first, the second support member 2 is in the second unlocked position, and the third support member 3 rotates relative to the fourth support member 4 around the third rotation axis by the third preset angle, such that the part of the display panel corresponding to the third support member 3 is unfolded. Further, the third support member 3 is configured to drive the part of the display panel corresponding to the second support member 2 to rotate relative to the fourth support member 4 by the third preset angle, and the third support member 3 is also configured to drive the part of the display panel corresponding to the first support member 1 to rotate relative to the fourth support member 4 by the third preset angle.

Then, the second support member 2 is moved to the second locked position, the first support member 1 is in the first unlocked position in this case, the third support member 3 and the fourth support member 4 are fixed relative to each other, and the corresponding parts of the display panel (the part corresponding to the third support member 3 and the part corresponding to the fourth support member 4) are stably supported by the third support member 3 and the fourth support member 4, such that the part of the display panel corresponding to the second support member 2 is unfolded, and the part of the display panel corresponding to the first support member 1 rotates relative to the third support member 3 by the second preset angle. Subsequently, the first support member 1 is moved to the first locked position, the second support member 2 and the third support member 3 are fixed relative to each other in this case, the corresponding parts of the display panel (the part corresponding to the second support member 2 and the part corresponding to the third support member 3) are stably supported by the second support member 2 and the third support member 3, and the part of the display panel corresponding to the first support member 1 are unfolded. Finally, the unfolding of at least part of the foldable display screen is completed.

The achievement of the bending, folding and unfolding processes of the support assembly 100 only needs to form a rotation pair between the third support member 3 and the fourth support member 4, so as to achieve that the third support member 3 can rotate relative to the fourth support member 4. Further, a stop structure is arranged among the first support member 1, the second support member 2, the third support member 3 and the fourth support member 4, such that when the second support member 2 is in the second locked position, the third support member 3 and the fourth support member 4 are fixed relative to each other, and when the second support member 2 is in the second unlocked position, the third support member 3 can rotate relative to the fourth support member 4. Compared to the related art, the size and weight of the support assembly are further reduced, such that the thickness and weight of the foldable display screen can be further reduced, and further, the thickness and weight of the terminal device with the foldable display screen can be reduced, which is conducive to the lightweight design of the terminal device with the foldable display screen.

In some embodiments, the first support member 1 includes a first support body 101 and a first fitting portion 102 arranged on the first support body 101. The second support member 2 includes a second support body 201 and a second fitting portion 202 arranged on the second support body 201. The second fitting portion 202 is rotatably arranged to the first fitting portion 102 such that the first support member 1 is rotatably arranged to the second support member 2.

In order to more easily understand the technical solution of the present disclosure, the technical solution of the present disclosure is further described by taking an example below, in which a thickness direction of the first support member 1 is consistent with an up-down direction when the display panel is fully unfolded. The up-down direction is shown in FIGS. 1 to 4.

For example, as shown in FIGS. 1 to 4, the first fitting portion 102 is arranged on an upper surface of the first support body 101, and the second fitting portion 202 is arranged on an upper surface of the second support body 201. The display panel is arranged on lower sides of the first support body 101 and the second support body 201 such that a lower surface of the first support body 101 and a lower surface of the second support body 201 may be used to support corresponding parts of the display panel (a part corresponding to the first support body 101 and a part corresponding to the second support body 201).

Thus, when the foldable display screen needs to be bent and folded or unfolded, the first fitting portion 102 rotates relative to the second fitting portion 202 such that the first support member 1 rotates relative to the second support member 2, which is not only convenient for the rotation of the first support member 1 relative to the second support member 2, but also is conducive to simplifying the structures of the first support member 1 and the second support member 2, thus further reducing the size and weight of the support assembly 100, further reducing the thickness and weight of the foldable display screen, and further reducing the thickness and weight of the terminal device with the foldable display screen.

In some embodiments, the first fitting portion 102 overhangs an edge of the first support body 101 along a direction towards the second support body 201. The second fitting portion 202 overhangs an edge of the second support body 201 along a direction towards the first support body 101.

For example, as shown in FIGS. 1 to 5, the first fitting portion 102 overhangs a right edge of the first support body 101 rightwards, and the second fitting portion 202 overhangs a left edge of the second support body 201 leftwards.

Thus, the first fitting portion 102 and the second fitting portion 202 are close to each other and have overlapping parts with each other, which is convenient for the first fitting portion 102 to be fitted with the second fitting portion 202, thus simplifying the structure of the support assembly 100 and facilitating the assembling of the support assembly 100.

In some embodiments, one of the first fitting portion 102 and the second fitting portion 202 is a first sliding block, and the other one of the first fitting portion 102 and the second fitting portion 202 is a first sliding piece. The first sliding block is provided with a first sliding slot 2021 with an opening facing the first sliding piece, and a part of the first sliding piece is slidably arranged in the first sliding slot 2021 along an arrangement direction of the first support body 101 and the second support body 201 through the opening of the first sliding slot 2021.

For example, as shown in FIG. 2, the first fitting portion 102 is the first sliding piece, the second fitting portion 202 is the first sliding block, and the first fitting portion 102 is located on a left side of the second fitting portion 202. The second fitting portion 202 is provided with the first sliding slot 2021 having the opening facing leftwards, and a part of the first fitting portion 102 is slidably arranged in the first sliding slot 2021 along the left-right direction through the opening of the second fitting portion 202. Of course, in some other embodiments, the first fitting portion may also be the first sliding block, the second fitting portion may be the first sliding piece, and the first fitting portion may be provided with the first sliding slot having the opening facing rightwards.

Thus, the first sliding piece is configured to slide relative to the first sliding slot 2021 along the arrangement direction of the first support body 101 and the second support body 201, so as to achieve the rotation of the first support member 1 relative to the second support member 2. The structures of the first fitting portion 102 and the second fitting portion 202 are simple, which is conducive to simplifying the structure of the support assembly 100 and facilitating the assembling of the support assembly 100.

In some embodiments, the first sliding slot 2021 is a through slot. In other words, the first sliding slot 2021 is a through slot running through the first sliding block along a length direction of the second support body 201. For example, as shown in FIGS. 1 to 4, the first sliding slot 2021 runs through the second fitting portion 202 in the front-rear direction.

In some embodiments, the first sliding piece is an arc sliding piece, and the first sliding piece is fitted with the first sliding slot 2021.

For example, as shown in FIGS. 1 to 4, the first sliding piece is a circular-arc sliding piece, and a side wall of the first sliding slot 2021 has a circular-arc shape. The first sliding piece has a first upper surface and a first lower surface facing away from each other in the up-down direction, and the first sliding slot 2021 has a first upper side wall and a first lower side wall opposite to each other in the up-down direction. The first upper surface is fitted to the first upper side wall, and the first upper surface can slide relative to the first upper side wall in the left-right direction. The first lower surface is fitted to the first lower side wall, and the first lower surface can slide relative to the first lower side wall in the left-right direction.

Thus, on one hand, the sliding of the first sliding piece can be guided by the fit of the first sliding slot 2021 with the first sliding piece, which is conducive to improving the motion reliability between the first support member 1 and the second support member 2, so as to improve the reliability of the support assembly 100, and then improve the reliability of the foldable display screen with the support assembly 100 and the reliability of the terminal device with the foldable display screen. On the other hand, through the fit of the first sliding slot 2021 with the first sliding piece, the side walls of the first sliding slot 2021 can be used to limit a position of the first sliding piece in the up-down direction, and thus the first sliding piece is prevented from falling out of the first sliding slot 2021 in the up-down direction, so as to facilitate the assembling of the support assembly 100.

In some embodiments, the second support member 2 includes a second support body 201 and a third fitting portion 203 arranged on the second support body 201. The third support member 3 includes a third support body 301 and a fourth fitting portion 302 arranged on the third support body 301. The fourth fitting portion 302 is rotatably arranged to the third fitting portion 203 such that the third support member 3 is rotatably arranged to the second support member 2.

For example, as shown in FIGS. 1 to 4, the third fitting portion 203 is arranged on an upper surface of the second support body 201, and the fourth fitting portion 302 is arranged on an upper surface of the third support body 301. The display panel is arranged on lower sides of the second support body 201 and the third support body 301 such that a lower surface of the second support body 201 and a lower surface of the third support body 301 may be used to support corresponding parts of the display panel (a part corresponding to the second support body 201 and a part corresponding to the third support body 301).

Thus, when the foldable display screen needs to be bent and folded or unfolded, the third fitting portion 203 rotates relative to the fourth fitting portion 302 to achieve the rotation of the second support member 2 relative to the third support member 3, which is not only convenient for the rotation of the second support member 2 relative to the third support member 3, but also is conducive to simplifying the structures of the second support member 2 and the third support member 3, thus further reducing the size and weight of the support assembly 100, further reducing the thickness and weight of the foldable display screen, and further reducing the thickness and weight of the terminal device with the foldable display screen.

In some embodiments, the third fitting portion 203 overhangs an edge of the second support body 201 along a direction towards the third support body 301. The fourth fitting portion 302 overhangs an edge of the third support body 301 along a direction towards the second support body 201.

For example, as shown in FIGS. 1 to 5, the third fitting portion 203 overhangs a right edge of the second support body 201 rightwards, and the fourth fitting portion 302 overhangs a left edge of the third support body 301 leftwards.

Thus, the third fitting portion 203 and the fourth fitting portion 302 are close to each other and have overlapping parts with each other, which is convenient for the third fitting portion 203 to be fitted with the fourth fitting portion 302, thus simplifying the structure of the support assembly 100 and facilitating the assembling of the support assembly 100.

In some embodiments, one of the third fitting portion 203 and the fourth fitting portion 302 is a second sliding block, and the other one of the third fitting portion 203 and the fourth fitting portion 302 is a second sliding piece. The second sliding block is provided with a second sliding slot 3021 with an opening facing the second sliding piece, and a part of the second sliding piece is slidably arranged in the second sliding slot 3021 along an arrangement direction of the second support body 201 and the third support body 301 through the opening of the second sliding slot 3021.

For example, as shown in FIG. 2, the third fitting portion 203 is the second sliding piece, the fourth fitting portion 302 is the second sliding block, and the third fitting portion 203 is located on a left side of the fourth fitting portion 302. The fourth fitting portion 302 is provided with the second sliding slot 3021 having the opening facing leftwards, and a part of the third fitting portion 203 is slidably arranged in the second sliding slot 3021 along the left-right direction through the opening of the fourth fitting portion 302. Of course, in some other embodiments, the third fitting portion may also be the second sliding block, the fourth fitting portion may be the second sliding piece, and the third fitting portion may be provided with the second sliding slot having the opening facing rightwards.

Thus, the second sliding piece is configured to slide relative to the second sliding slot 3021 along the arrangement direction of the third support body 301 and the second support body 201, so as to achieve the rotation of the second support member 2 relative to the third support member 3. The structures of the third fitting portion 203 and the fourth fitting portion 302 are simple, which is conducive to simplifying the structure of the support assembly 100 and facilitating the assembling of the support assembly 100.

In some embodiments, the second sliding slot 3021 is a through slot. In other words, the second sliding slot 3021 is a through slot running through the second sliding block along a length direction of the third support body 301. For example, as shown in FIGS. 1 to 4, the second sliding slot 3021 runs through the fourth fitting portion 302 in the front-rear direction.

In some embodiments, the second sliding piece is an arc sliding piece, and the second sliding piece is fitted with the second sliding slot 3021.

For example, as shown in FIGS. 1 to 4, the second sliding piece is a circular-arc sliding piece, and a side wall of the second sliding slot 3021 has a circular-arc shape. The second sliding piece has a second upper surface and a second lower surface facing away from each other in the up-down direction, and the second sliding slot 3021 has a second upper side wall and a second lower side wall opposite to each other in the up-down direction. The second upper surface is fitted to the second upper side wall, and the second upper surface may slide relative to the second upper side wall in the left-right direction. The second lower surface is fitted to the second lower side wall, and the second lower surface may slide relative to the second lower side wall in the left-right direction.

Thus, on one hand, the sliding of the second sliding piece can be guided by the fit of the second sliding slot 3021 with the second sliding piece, which is conducive to improving the motion reliability between the second support member 2 and the third support member 3, so as to improve the reliability of the support assembly 100, and then improve the reliability of the foldable display screen with the support assembly 100 and the reliability of the terminal device with the foldable display screen. On the other hand, through the fit of the second sliding slot 3021 with the second sliding piece, the side walls of the second sliding slot 3021 can be used to limit a position of the second sliding piece in the up-down direction, and thus the second sliding piece is prevented from falling out of the second sliding slot 3021 in the up-down direction, so as to facilitate the assembling of the support assembly 100.

In some embodiments, the third support member 3 includes a fifth fitting portion 303 arranged on the third support body 301. The fourth support member 4 includes a fourth support body 401 and a sixth fitting portion 402 arranged on the fourth support body 401. The sixth fitting portion 402 is rotatably arranged to the fifth fitting portion 303 such that the fourth support member 4 is rotatably arranged to the third support member 3.

For example, as shown in FIGS. 1 to 4, the fifth fitting portion 303 is arranged on an upper surface of the third support body 301, and the sixth fitting portion 402 is arranged on an upper surface of the fourth support body 401. The display panel is arranged on lower sides of the third support body 301 and the fourth support body 401 such that a lower surface of the third support body 301 and a lower surface of the fourth support body 401 may be used to support corresponding parts of the display panel (the part corresponding to the third support body 301 and a part corresponding to the fourth support body 401).

Thus, when the foldable display screen needs to be bent and folded or unfolded, the fifth fitting portion 303 rotates relative to the sixth fitting portion 402 to achieve the rotation of the third support member 3 relative to the fourth support member 4, which is not only convenient for the rotation of the third support member 3 relative to the fourth support member 4, but also conducive to simplifying the structure of the third support member 3 and the fourth support member 4, thus further reducing the size and weight of the support assembly 100, further reducing the thickness and weight of the foldable display screen, and further reducing the thickness and weight of the terminal device with the foldable display screen.

In some embodiments, the fifth fitting portion 303 overhangs an edge of the third support body 301 along a direction towards the fourth support body 401. The sixth fitting portion 402 overhangs an edge of the fourth support body 401 along a direction towards the third support body 301.

For example, as shown in FIGS. 1 to 5, the fifth fitting portion 303 overhangs a right edge of the third support body 301 rightwards, and the sixth fitting portion 402 overhangs a left edge of the fourth support body 401 leftwards.

Thus, the fifth fitting portion 303 and the sixth fitting portion 402 are close to each other and have overlapping parts with each other, which is convenient for the fifth fitting portion 303 to be fitted with the sixth fitting portion 402, thus simplifying the structure of the support assembly 100 and facilitating the assembling of the support assembly 100.

In some embodiments, one of the fifth fitting portion 303 and the sixth fitting portion 402 is a third sliding block, and the other one of the fifth fitting portion 303 and the sixth fitting portion 402 is a third sliding piece. The third sliding block is provided with a third sliding slot 4021 with an opening facing the third sliding piece, and a part of the third sliding piece is slidably arranged in the third sliding slot 4021 along an arrangement direction of the third support body 301 and the fourth support body 401 through the opening of the third sliding slot 4021.

For example, as shown in FIG. 2, the fifth fitting portion 303 is the third sliding piece, the sixth fitting portion 402 is the third sliding block, and the fifth fitting portion 303 is located on a left side of the sixth fitting portion 402. The sixth fitting portion 402 is provided with the third sliding slot 4021 having the opening facing leftwards, and a part of the fifth fitting portion 303 is slidably arranged in the third sliding slot 4021 along the left-right direction through the opening of the sixth fitting portion 402. Of course, in some other embodiments, the fifth fitting portion may also be the third sliding block, the sixth fitting portion may be the third sliding piece, and the fifth fitting portion may be provided with the third sliding slot having the opening facing rightwards.

Thus, the third sliding piece is configured to slide relative to the third sliding slot 4021 along the arrangement direction of the third support body 301 and the fourth support body 401, so as to achieve the rotation of the third support member 3 relative to the fourth support member 4. The structures of the fifth fitting portion 303 and the sixth fitting portion 402 are simple, which is conducive to simplifying the structure of the support assembly 100 and facilitating the assembling of the support assembly 100.

In some embodiments, the third sliding slot 4021 is a through slot. In other words, the third sliding slot 4021 is a through slot running through the third sliding block along a length direction of the fourth support body 401. For example, as shown in FIGS. 1 to 4, the third sliding slot 4021 runs through the sixth fitting portion 402 in the front-rear direction.

In some embodiments, the third sliding piece is an arc sliding piece, and the third sliding piece is fitted with the third sliding slot 4021.

For example, as shown in FIGS. 1 to 4, the third sliding piece is a circular-arc sliding piece, and a side wall of the third sliding slot 4021 has a circular-arc shape. The third sliding piece has a third upper surface and a third lower surface facing away from each other in the up-down direction, and the third sliding slot 4021 has a third upper side wall and a third lower side wall opposite to each other in the up-down direction. The third upper surface is fitted to the third upper side wall, and the third upper surface may slide relative to the third upper side wall in the left-right direction. The third lower surface is fitted to the third lower side wall, and the third lower surface may slide relative to the third lower side wall in the left-right direction.

Thus, on one hand, the sliding of the third sliding piece can be guided by the fit of the third sliding slot 4021 with the third sliding piece, which is conducive to improving the motion reliability between the third support member 3 and the fourth support member 4, so as to improve the reliability of the support assembly 100, and then improve the reliability of the foldable display screen with the support assembly 100 and the reliability of the terminal device with the foldable display screen. On the other hand, through the fit of the third sliding slot 4021 with the third sliding piece, the side walls of the third sliding slot 4021 can be used to limit a position of the third sliding piece in the up-down direction, and thus the third sliding piece is prevented from falling out of the third sliding slot 4021 in the up-down direction, so as to facilitate the assembling of the support assembly 100.

Of course, in some other embodiments, other structures may also be arranged on the first support member and the second support member such that the first support member can rotate relative to the second support member. For example, a hinge is arranged between the first support member and the second support member such that the first support member can rotate relative to the second support member. Other structures may also be arranged on the second support member and the third support member such that the second support member can rotate relative to the third support member. For example, a hinge is arranged between the second support member and the third support member such that the second support member can rotate relative to the third support member. Other structures may also be arranged on the third support member and the fourth support member such that the third support member can rotate relative to the fourth support member. For example, a hinge is arranged between the third support member and the fourth support member such that the third support member can rotate relative to the fourth support member.

In some embodiments, the first support member 1 includes a first stop portion 103 arranged on the first support body 101, and the third support member 3 includes a second stop portion 304 arranged on the third support body 301. When the first support member 1 is in the first locked position, the first stop portion 103 and the second support member 2 are spaced apart from each other such that the first support member 1 can rotate relative to the second support member 2, and one of the first stop portion 103 and the second stop portion 304 is configured to abut against the other one of the first stop portion 103 and the second stop portion 304, such that the second support member 2 and the third support member 3 are fixed relative to each other. When the first support member 1 is in the first unlocked position, the second stop portion 304 disengages from the first stop portion 103 such that the second support member 2 may rotate relative to the third support member 3.

One of the first stop portion 103 and the second stop portion 304 being configured to abut against the other one of the first stop portion 103 and the second stop portion 304, may be understood as follows: when the first support member 1 is in the first locked position, if the second support member 2 rotates relative to the third support member 3, one of the first stop portion 103 and the second stop portion 304 abuts against the other one of the first stop portion 103 and the second stop portion 304, so as to prevent the second support member 2 from rotating relative to the third support member 3, and if the second support member 2 does not rotate relative to the third support member 3, one of the first stop portion 103 and the second stop portion 304 does not abut against the other one of the first stop portion 103 and the second stop portion 304.

For example, as shown in FIGS. 1 to 4, the first stop portion 103 is arranged on the upper surface of the first support body 101, and the second stop portion 304 is arranged on the upper surface of the second support body 201. When the first support member 1 is in the first locked position, the first stop portion 103 and the second support member 2 are spaced apart from each other in the up-down direction to prevent the first stop portion 103 from blocking the rotation of the first support member 1 relative to the second support member 2. Moreover, when the first support member 1 is in the first locked position, the second stop portion 304 is configured to abut against the first stop portion 103 to prevent the second support member 2 from rotating relative to the third support member 3. When the first support member 1 is in the first unlocked position, the second stop portion 304 and the first stop portion 103 are staggered in the left-right direction, such that the second stop portion 304 disengages from the first stop portion 103, and the second support member 2 may rotate relative to the third support member 3 in this case.

When the foldable display screen needs to be bent and folded, and the first support member 1 is in the first locked position, one of the first stop portion 103 and the second stop portion 304 is configured to abut against the other one of the first stop portion 103 and the second stop portion 304 so as to prevent the second support member 2 from rotating relative to the third support member 3, such that the second support member 2 and the third support member 3 are fixed relative to each other. When the foldable display screen needs to be bent and folded, and the first support member 1 is in the first unlocked position, the second stop portion 304 is configured to disengage from the first stop portion 103, such that the second support member 2 can rotate relative to the third support member 3.

Thus, the first stop portion 103 and the second stop portion 304 form a stop structure among the first support member 1, the second support member 2 and the third support member 3. The stop structure is simple, which is conducive to further reducing the size and weight of the support assembly 100. Thus, the thickness and weight of the foldable display screen can be further reduced, and the thickness and weight of the terminal device with the foldable display screen can be further reduced.

In some embodiments, when the first support member 1 is in the first unlocked position, the first stop portion 103 abuts against the second support body 201 such that the second support member 2 and the first support member 1 are fixed relative to each other.

For example, when the first support member 1 is in the first unlocked position, a right edge of the first stop portion 103 abuts against the second support body 201. In this case, under a blocking action of the first stop portion 103, the first support member 1 cannot rotate relative to the second support member 2, such that the first support member 1 and the second support member 2 are fixed relative to each other. In this way, the first support member 1 and the second support member 2 may rotate as a whole relative to the third support member 3. In addition, the corresponding parts of the display panel (the part corresponding to the first support member 1 and the part corresponding to the second support member 2) can be stably supported by the first support member 1 and the second support member 2, which is beneficial to further improving the reliability of the support assembly 100.

In some embodiments, the first stop portion 103 overhangs the edge of the first support body 101 along a direction towards the third support body 301, and the second stop portion 304 overhangs an edge of the third support body 301 along a direction towards the first support body 101.

For example, as shown in FIGS. 1 to 5, the first stop portion 103 overhangs the right edge of the first support body 101 rightwards, and the second stop portion 304 overhangs the left edge of the third support body 301 leftwards.

Thus, the first stop portion 103 and the second stop portion 304 are close to each other, and even have overlapping parts with each other, which is convenient for the first stop portion 103 to be fitted with the second stop portion 304, thus simplifying the structure of the support assembly 100 and facilitating the assembling of the support assembly 100.

In some embodiments, one of the first stop portion 103 and the second stop portion 304 is a first stop piece, the first stop piece is provided with a first relief notch 1031, and the other one of the first stop portion 103 and the second stop portion 304 is a first stop block. When the first support member 1 is in the first locked position, the first stop block can abut against the first stop piece. When the first support member 1 is in the first unlocked position, the first stop block is located in the first relief notch 1031, such that the second stop portion 304 disengages from the first stop portion 103.

For example, as shown in FIG. 2, the first stop portion 103 is the first stop piece, the second stop portion 304 is the first stop block, and the first stop portion 103 is located on a left side of the second stop portion 304. The first stop piece is provided with the first relief notch 1031. Of course, in some other embodiments, the first stop portion may also be the first stop block, the second stop portion is the first stop piece, and the first stop piece is provided with the first relief notch.

Thus, when the first support member 1 is in the first locked position, the first stop block abuts against the first stop piece, such that the second support member 2 and the third support member 3 are fixed relative to each other. When the first support member 1 is in the first unlocked position, the first stop block is located in the first relief notch 1031, such that the second stop portion 304 disengages from the first stop portion 103, and the second support member 2 can rotate relative to the third support member 3. The structures of the first stop portion 103 and the second stop portion 304 are simple, which is conducive to simplifying the structure of the support assembly 100 and facilitating the assembling of the support assembly 100.

In some embodiments, the second support member 2 includes a third stop portion 204 arranged on the second support body 201, and the fourth support member 4 includes a fourth stop portion 403 arranged on the fourth support body 401. When the second support member 2 is in the second locked position, the third stop portion 204 and the third support member 3 are spaced apart from each other such that the second support member 2 can rotate relative to the third support member 3, and one of the third stop portion 204 and the fourth stop portion 403 is configured to abut against the other one of the third stop portion 204 and the fourth stop portion 403 such that the third support member 3 and the fourth support member 4 are fixed relative to each other. When the second support member 2 is in the second unlocked position, the fourth stop portion 403 disengages from the third stop portion 204 such that the third support member 3 can rotate relative to the fourth support member 4.

When the foldable display screen needs to be bent and folded, and the second support member 2 is in the second locked position, one of the third stop portion 204 and the fourth stop portion 403 is configured to abut against the other one of the third stop portion 204 and the fourth stop portion 403 to prevent the third support member 3 from rotating relative to the fourth support member 4, such that the third support member 3 and the fourth support member 4 are fixed relative to each other. When the foldable display screen needs to be bent and folded, and the second support member 2 is in the second unlocked position, the fourth stop portion 403 is configured to disengage from the third stop portion 204, such that the third support member 3 can rotate relative to the fourth support member 4.

Thus, the third stop portion 204 and the fourth stop portion 403 form a stop structure among the second support member 2, the third support member 3 and the fourth support member 4. The stop structure is simple, which is conducive to further reducing the size and weight of the support assembly 100. Thus, the thickness and weight of the foldable display screen can be further reduced, and the thickness and weight of the terminal device with the foldable display screen can be further reduced.

Of course, in some other embodiments, a stop structure may also be arranged between the second support member and the third support member, such that when the first support member is in the first locked position, the second support member and the third support member are fixed relative to each other, and when the first support member is in the first unlocked position, the second support member can rotate relative to the third support. A stop structure may also be arranged between the third support member and the fourth support member, such that when the second support member is in the second locked position, the third support member and the fourth support member are fixed relative to each other, and when the second support member is in the second unlocked position, the third support member can rotate relative to the fourth support member.

In some embodiments, when the second support member 2 is in the second unlocked position, the third stop portion 204 abuts against the third support member 3 such that the second support member 2 and the third support member 3 are fixed relative to each other.

For example, when the second support member 2 is in the second unlocked position, a right edge of the third stop portion 204 abuts against the third support body 301. In this case, under a blocking action of the third stop portion 204, the second support member 2 cannot rotate relative to the third support member 3, such that the second support member 2 and the third support member 3 are fixed relative to each other. In this case, the second support member 2 and the third support member 3 may rotate as a whole relative to the fourth support member 4. In addition, the corresponding parts of the display panel (the part corresponding to the second support member 2 and the part corresponding to the third support member 3) can be stably supported by the second support member 2 and the third support member 3, which is beneficial to further improving the reliability of the support assembly 100.

In some embodiments, the third stop portion 204 overhangs the edge of the second support body 201 along a direction towards the fourth support body 401, and the fourth stop portion 403 overhangs the edge of the fourth support body 401 along a direction towards the second support body 201.

For example, as shown in FIGS. 1 to 5, the third stop portion 204 overhangs the right edge of the second support body 201 rightwards, and the fourth stop portion 403 overhangs the left edge of the fourth support body 401 leftwards.

Thus, the third stop portion 204 and the fourth stop portion 403 are close to each other, and even have overlapping parts with each other, which is convenient for the third stop portion 204 to be fitted with the fourth stop portion 403, thus simplifying the structure of the support assembly 100 and facilitating the assembling of the support assembly 100.

In some embodiments, one of the third stop portion 204 and the fourth stop portion 403 is a second stop piece, the second stop piece is provided with a second relief notch

2041, and the other one of the third stop portion 204 and the fourth stop portion 403 is a second stop block. When the second support member 2 is in the second locked position, the second stop block can abut against the second stop piece. When the second support member 2 is in the second unlocked position, the second stop block is located in the second relief notch 2041, such that the fourth stop portion 403 disengages from the third stop portion 204.

For example, as shown in FIG. 2, the third stop portion 204 is the second stop piece, the fourth stop portion 403 is the second stop block, and the third stop portion 204 is located on a left side of the fourth stop portion 403. The second stop piece is provided with the second relief notch 2041. Of course, in some other embodiments, the third stop portion may also be the second stop block, the fourth stop portion is the second stop piece, and the second stop piece is provided with the second relief notch.

Thus, when the second support member 2 is in the second locked position, the second stop block abuts against the second stop piece, such that the third support member 3 and the fourth support member 4 are fixed relative to each other. When the second support member 2 is in the second unlocked position, the second stop block is located in the second relief notch 2041, such that the fourth stop portion 403 disengages from the third stop portion 204, and the third support member 3 can rotate relative to the fourth support member 4. The structures of the third stop portion 204 and the fourth stop portion 403 are simple, which is conducive to simplifying the structure of the support assembly 100 and facilitating the assembling of the support assembly 100.

In some embodiments, the third fitting portion 203 is the second sliding piece, the third stop portion 204 is the second stop piece, and the second sliding piece is provided with the second stop piece. The second sliding piece includes a fitting section 2031 and a stop section 2032 connected with each other. A part of the fitting section 2031 is slidably arranged in the second sliding slot 3021 along the arrangement direction of the second support body 201 and the third support body 301, and the second relief notch 2041 is formed in the stop section 2032. When the second support member 2 is in the second locked position, the second stop block can abut against the stop section 2032.

For example, as shown in FIGS. 1 to 4, the third fitting portion 203 and the third stop portion 204 are the same component, that is, the second stop piece and the second sliding piece are the same component. The second sliding piece includes the fitting section 2031 and the stop section 2032 arranged in the front-rear direction, and the fitting section 2031 is arranged at a rear side of the stop section 2032. When the second support member 2 is in the second locked position, the second stop block can abut against a front part (the stop section 2032) of the second sliding piece. When the second support member 2 is in the second unlocked position, the second stop block is located in the second relief notch 2041 of the stop section 2032.

Thus, the third fitting portion 203 and the third stop portion 204 are the same component, thereby further simplifying the structures of the first support member 1 and the third support member 3, which is not only convenient for the processing and assembling of the support assembly 100, but also is conducive to further reducing the size and weight of the support assembly 100. Thus, the thickness and weight of the foldable display screen can be further reduced, and the thickness and weight of the terminal device with the foldable display screen can be further reduced.

In some embodiments, the first support body 101, the second support body 201 and the third support body 301 are arranged along a width direction of the first support body 101. The first fitting portion 102 and the first stop portion 103 are spaced apart from each other along a length direction of the first support body 101. The third fitting portion 203 is located between the second fitting portion 202 and the first stop portion 103 in the length direction of the first support body 101. In other words, the third fitting portion 203 is located between the first fitting portion 102 and the first stop portion 103 in the length direction of the first support body 101.

For example, as shown in FIGS. 1 to 5, the width direction of the first support body 101 is consistent with the left-right direction, and the length direction of the first support body 101 is consistent with the front-rear direction. The first support body 101, the second support body 201 and the third support body 301 are arranged in the left-right direction. The second fitting portion 202 and the first stop portion 103 are spaced apart from each other along the front-rear direction, and the third fitting portion 203 is located between the second fitting portion 202 and the first stop portion 103 in the front-rear direction.

Thus, the structures of the second fitting portion 202 (the first fitting portion 102), the first stop portion 103 and the third fitting portion 203 (the third stop portion 204) are more compact, which is conducive to further reducing the size and weight of the support assembly 100, thus further reducing the thickness and weight of the foldable display screen, and further reducing the thickness and weight of the terminal device with the foldable display screen.

In some embodiments, the third support body 301 and the fourth support body 401 are arranged along the width direction of the first support body 101. The sixth fitting portion 402 and the first stop portion 103 are spaced apart from each other along the length direction of the first support body 101, and the third fitting portion 203 is located between the sixth fitting portion 402 and the first stop portion 103 in the length direction of the first support body 101.

For example, as shown in FIGS. 1 to 5, the third support body 301 and the fourth support body 401 are arranged in the left-right direction. The sixth fitting portion 402 and the first stop portion 103 are spaced apart from each other along the front-rear direction, and the third fitting portion 203 is located between the sixth fitting portion 402 and the first stop portion 103 in the front-rear direction.

Thus, the structures of the sixth fitting portion 402 (the fifth fitting portion 303), the first stop portion 103 and the third fitting portion 203 (the third stop portion 204) are more compact, which is conducive to further reducing the size and weight of the support assembly 100, thus further reducing the thickness and weight of the foldable display screen, and further reducing the thickness and weight of the terminal device with the foldable display screen.

In some embodiments, the second stop portion 304 is arranged on the fourth fitting portion 302.

For example, as shown in FIGS. 1 to 4, the second stop portion 304 is arranged to a left edge of the fourth fitting portion 302.

Thus, the structure of the third support member 3 is more compact, which is conducive to further reducing the size and weight of the support assembly 100, thereby further reducing the thickness and weight of the foldable display screen, and further reducing the thickness and weight of the terminal device with the foldable display screen.

In some embodiments, the second stop portion 304 and the fourth fitting portion 302 are integrally formed.

The second stop portion 304 and the fourth fitting portion 302 are integrally formed to facilitate the processing of the third support member 3, thereby facilitating the processing of the support assembly 100.

In some embodiments, the fourth stop portion 403 is arranged on the sixth fitting portion 402.

For example, as shown in FIGS. 1 to 4, the fourth stop portion 403 is arranged to a left edge of the sixth fitting portion 402.

Thus, the structure of the fourth support member 4 is more compact, which is conducive to further reducing the size and weight of the support assembly 100, thereby further reducing the thickness and weight of the foldable display screen, and further reducing the thickness and weight of the terminal device with the foldable display screen.

In some embodiments, the fourth stop portion 403 and the sixth fitting portion 402 are integrally formed.

The fourth stop portion 403 and the sixth fitting portion 402 are integrally formed to facilitate the processing of the fourth support member 4, thereby facilitating the processing of the support assembly 100.

In some embodiments, the second stop portion 304 overhangs an edge of the fourth fitting portion 302 along the length direction of the first support body 101.

For example, as shown in FIGS. 1 to 4, the second stop portion 304 overhangs the edge of the fourth fitting portion 302 rearwards.

Thus, the second stop portion 304 and the first stop portion 103 are close to each other, and have overlapping parts with each other, which is convenient for the second stop portion 304 to be fitted with the first stop portion 103, thus simplifying the structure of the support assembly 100 and facilitating the assembling of the support assembly 100.

In some embodiments, the fourth stop portion 403 overhangs an edge of the sixth fitting portion 402 along the length direction of the first support body 101.

For example, as shown in FIGS. 1 to 4, the fourth stop portion 403 overhangs the edge of the sixth fitting portion 402 backwards.

Thus, the fourth stop portion 403 and the third stop portion 204 are close to each other, and have overlapping parts with each other, which is convenient for the fourth stop portion 403 to be fitted with the third stop portion 204, thus simplifying the structure of the support assembly 100 and facilitating the assembling of the support assembly 100.

In some embodiments, the structures of the first support member 1 and the third support member 3 are identical, and the structures of the second support member 2 and the fourth support member 4 are identical.

For example, the first support member 1 and the third support member 3 each are a first kind of support member, and the second support member 2 and the fourth support member 4 each are a second kind of support member.

The support assembly 100 mainly includes the first kind of support member and the second kind of support member, and the two kinds of support members are alternated and spaced apart from each other sequentially, thus simplifying the structure of the support assembly 100 and facilitating the assembling of the support assembly 100.

It may be understood by those skilled in the art that the above first kind of support member and the above second kind of support member have the fitting relationship not only with the support members located at their upper two stages (a left side in FIG. 1), but also with the support members located at their lower two stages (a right side in FIG. 1). Thus, the first kind of support member and the second kind of support member need to be provided with not only components fitted with the support members located at their upper two stages (the left side in FIG. 1), but also components fitted with the support members located at their lower two stages. The support member located at the first stage (not shown) merely needs to be fitted with the support members located at its lower two stages. Thus, the structure of the support member located at the first stage is different from that of the first kind of support member and that of the second kind of support member. The support member located at the second stage merely needs to be fitted with the support member located at its upper one stage and the support members located at its lower two stages. Thus, the structure of the support member located at the second stage is different from that of the first kind of support member and that of the second kind of support member. The support member located at the penultimate stage merely needs to be fitted with the support members located at its upper two stages and the support member located at its lower one stage. Thus, the structure of the support member located at the penultimate stage is different from that of the first kind of support member and that of the second kind of support member. The support member located at the last stage (not shown) merely needs to be fitted with the support members located at its upper two stages. Thus, the structure of the support member located at the last stage is different from that of the first kind of support member and that of the second kind of support member.

By taking the support assembly 100 shown in FIGS. 1 to 5 as an example, the support assembly 100 of an embodiment of the present disclosure is described in detail below.

As shown in FIGS. 1 to 5, the support assembly 100 includes a first support member 1, a second support member 2, a third support member 3, a fourth support member 4, a fifth support member 5, a sixth support member 6 and a seventh support member 7. The first support member 1, the second support member 2, the third support member 3, the fourth support member 4, the fifth support member 5, the sixth support member 6 and the seventh support member 7 are sequentially arranged along a left-right direction. The structures of the first support member 1, the third support member 3, the fifth support member 5 and the seventh support member 7 are identical, and the structures of the second support member 2, the fourth support member 4 and the sixth support member 6 are identical.

The first support member 1 includes a first support body 101 as well as a first fitting portion 102 and a first stop portion 103 arranged on the first support body 101. The first stop portion 103 is provided with a first relief notch 1031.

The second support member 2 includes a second support body 201 as well as a second fitting portion 202, a third fitting portion 203 and a third stop portion 204 arranged on the second support body 201. The second fitting portion 202 is provided with a second sliding slot 3021, the third fitting portion 203 and the third stop portion 204 are the same component, and the third stop portion 204 is provided with a second relief notch 2041.

The third support member 3 includes a third support body 301 as well as a fourth fitting portion 302, a fifth fitting portion 303, a second stop portion 304 and a fifth stop portion 305 arranged on the third support body 301. The fourth fitting portion 302 is provided with a second sliding slot 3021, the second stop portion 304 is arranged on the fourth fitting portion 302, and the fifth stop portion 305 is provided with a third relief notch 3051.

The fourth support member 4 includes a fourth support body 401 as well as a sixth fitting portion 402, a fourth stop portion 403, a seventh fitting portion 404 and a seventh stop portion 405 arranged on the fourth support body 401. The sixth fitting portion 402 is provided with a third sliding slot 4021, the fourth stop portion 403 is arranged on the sixth fitting portion 402, and the seventh stop portion 405 is provided with a fourth relief notch 4051.

The fifth support member 5 includes a fifth support body 501 as well as an eighth fitting portion 502, a ninth fitting portion 503, a sixth stop portion 504 and a ninth stop portion 505 arranged on the fifth support body 501. The eighth fitting portion 502 is provided with a fourth sliding slot, the sixth stop portion 504 is arranged on the eighth fitting portion 502, and the ninth stop portion 505 is provided with a fifth relief notch 5051. The eighth fitting portion 502 is rotatably arranged to the seventh fitting portion 404 such that the fifth support member 5 is rotatably arranged to the fourth support member 4.

The sixth support member 6 includes a sixth support body 601 as well as a tenth fitting portion 602, an eleventh fitting portion 603 and an eighth stop portion 604 arranged on the sixth support body 601. The eighth stop portion 604 is arranged on the tenth fitting portion 602. The tenth fitting portion 602 is rotatably arranged to the ninth fitting portion 503 such that the sixth support member 6 is rotatably arranged to the fifth support member 5.

The seventh support member 7 includes a seventh support body 701 as well as a twelfth fitting portion 702 and a tenth stop portion 704 arranged on the seventh support body 701, and the tenth stop portion 704 is arranged on the twelfth fitting portion 702. The twelfth fitting portion 702 is rotatably arranged to the eleventh fitting portion 603 such that the seventh support member 7 is rotatably arranged to the sixth support member 6.

The third support member 3 is movable between a third locked position and a third unlocked position. When the third support member 3 is in the third locked position, the third support member 3 can rotate relative to the fourth support member 4, and the fourth support member 4 and the fifth support member 5 are fixed relative to each other. When the third support member 3 is in the third unlocked position, the fourth support member 4 can rotate relative to the fifth support member 5.

The fourth support member 4 is movable between a fourth locked position and a fourth unlocked position. When the fourth support member 4 is in the fourth locked position, the fourth support member 4 can rotate relative to the fifth support member 5, and the fifth support member 5 and the sixth support member 6 are fixed relative to each other. When the fourth support member 4 is in the fourth unlocked position, the fifth support member 5 can rotate relative to the sixth support member 6.

The fifth support member 5 is movable between a fifth locked position and a fifth unlocked position. When the fifth support member 5 is in the fifth locked position, the fifth support member 5 can rotate relative to the sixth support member 6, and the sixth support member 6 and the seventh support member 7 are fixed relative to each other. When the fifth support member 5 is in the fifth unlocked position, the sixth support member 6 can rotate relative to the seventh support member 7.

Figure 3:
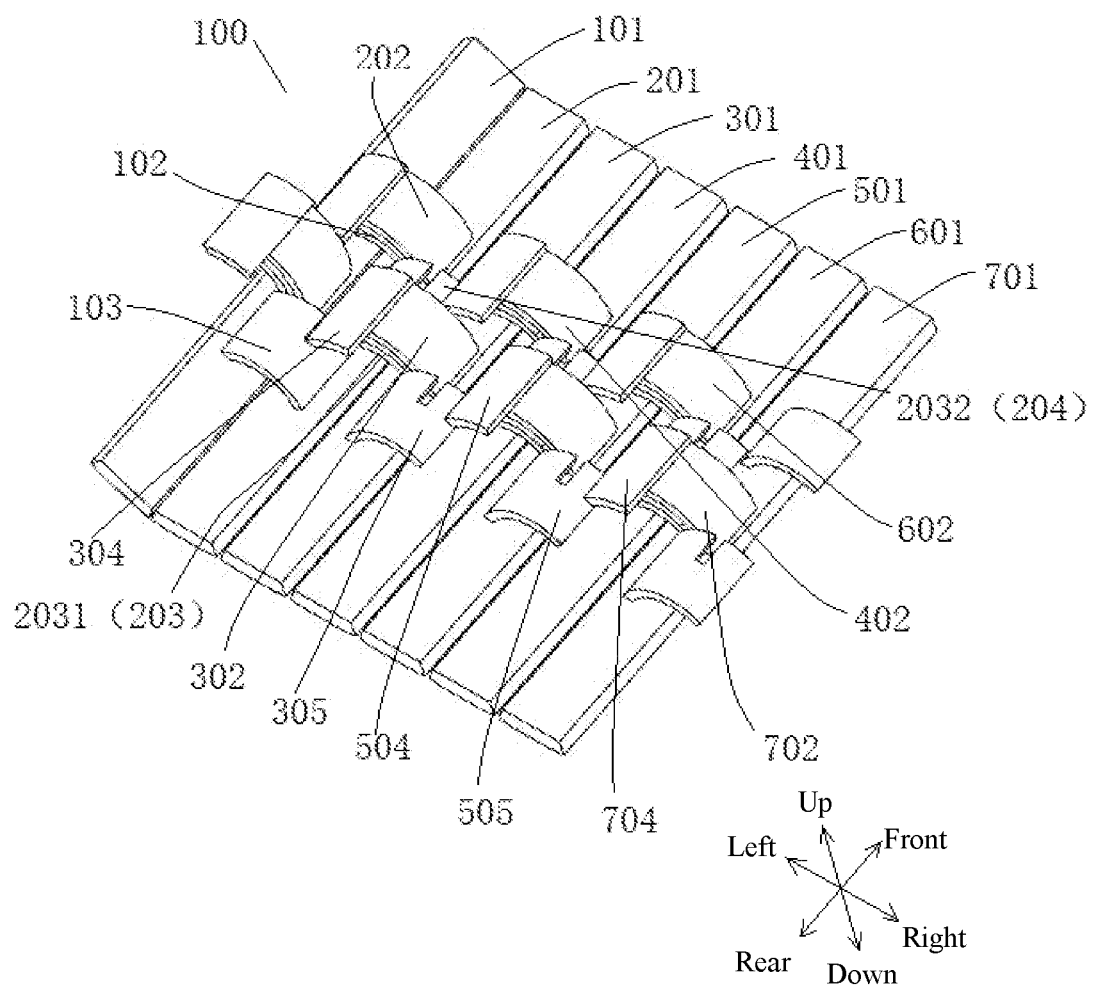
FIG. 3 is a schematic view of a support assembly in a second state according to an embodiment of the present disclosure.

When the foldable display screen is in an initial state (a state shown in FIG. 1) and the foldable display screen needs to be bent and folded, first, the first support member 1 is in a first locked position, and the second stop portion 304 can abut against the first stop portion 103, such that the second support member 2 and the third support member 3 are fixed relative to each other, and the first support member 1 rotates forwards by a first preset angle relative to the second support member 2. Then, the first support member 1 is moved to a first unlocked position (in this case, the second support member 2 is in a second locked position, as shown in FIG. 3), and the fourth stop portion 403 can abut against the third stop portion 204, such that the second support member 2 and the third support member 3 are fixed relative to each other. Moreover, the second stop portion 304 is located in the first relief notch 1031, the first stop portion 103 abuts against the second support body 201, and the first support member 1 and the second support member 2 rotate forwards by a second preset angle as a whole around the third support member 3.

Figure 4:
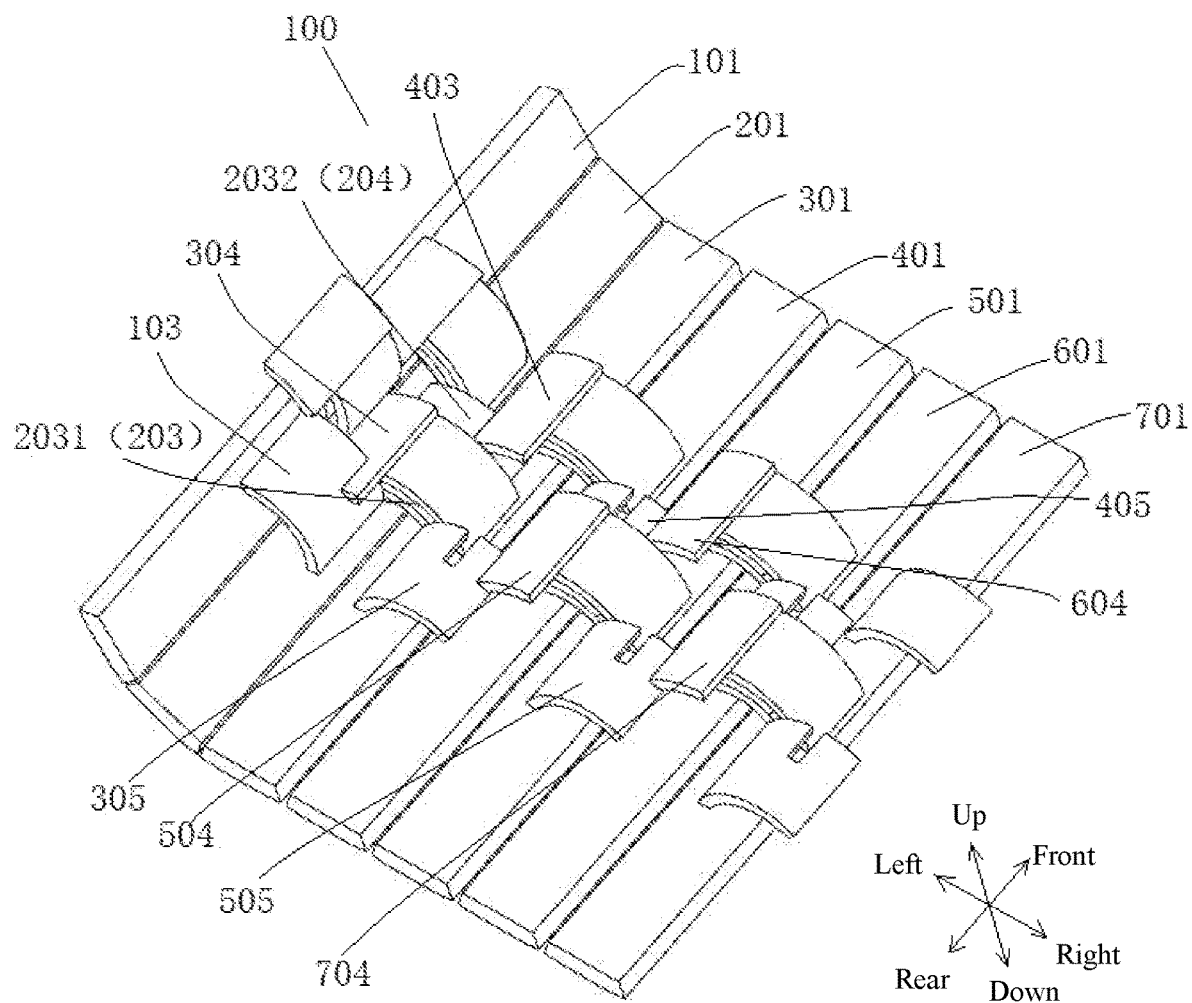
FIG. 4 is a schematic view of a support assembly in a third state according to an embodiment of the present disclosure.

Subsequently, the second support member 2 is moved to a second unlocked position (in this case, the third support member 3 is in a third locked position, as shown in FIG. 4), and the sixth stop portion 504 can abut against the fifth stop portion 305, such that the third support member 3 and the fourth support member 4 are fixed relative to each other. Moreover, the fourth stop portion 403 is located in the second relief notch 2041, the third stop portion 204 abuts against the third support body 301, and the first support member 1, the second support member 2 and the third support member 3 rotate forwards by a third preset angle as a whole around the fourth support member 4.

Subsequently, the third support member 3 is moved to the third unlocked position (in this case, the fourth support member 4 is in the fourth locked position), and the eighth stop portion 604 can abut against the seventh stop portion 405, such that the fourth support member 4 and the fifth support member 5 are fixed relative to each other. Moreover, the sixth stop portion 504 is located in the third relief notch 3051, the fifth stop portion 305 abuts against the fourth support body 401, and the first support member 1, the second support member 2, the third support member 3 and the fourth support member 4 rotate forwards by a fourth preset angle as a whole around the fifth support member 5.

Subsequently, the fourth support member 4 is moved to the fourth unlocked position (in this case, the fifth support member 5 is in the fifth locked position), and the tenth stop portion 704 can abut against the ninth stop portion 505, such that the fifth support member 5 and the sixth support member 6 are fixed relative to each other. Moreover, the eighth stop portion 604 is located in the fourth relief notch 4051, the seventh stop portion 405 abuts against the fifth support body 501, and the first support member 1, the second support member 2, the third support member 3, the fourth support member 4 and the fifth support member 5 rotate forwards by a fifth preset angle as a whole around the sixth support member 6.

Figure 5:
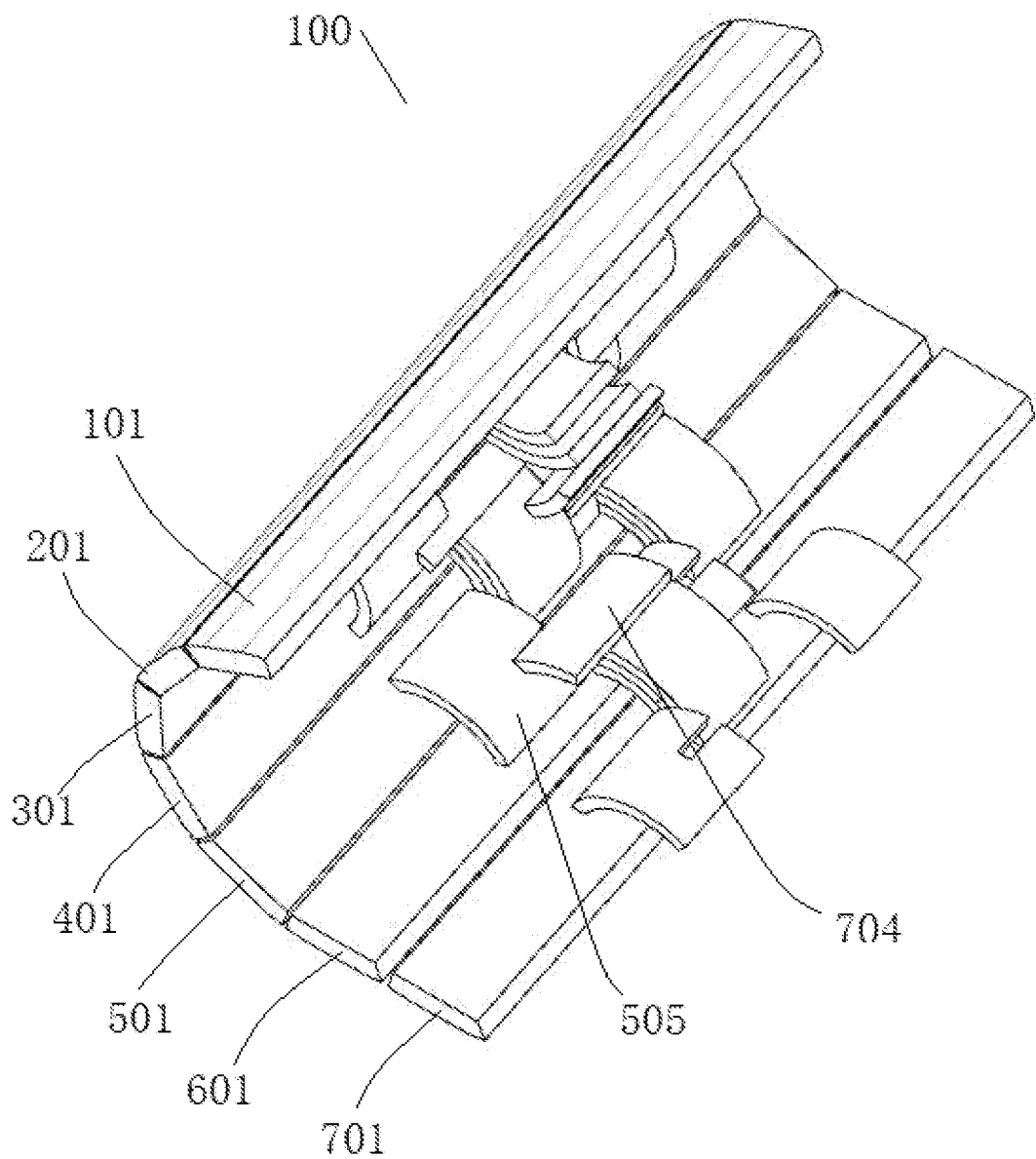
FIG. 5 is a schematic view of a support assembly in a fourth state according to an embodiment of the present disclosure.

Subsequently, the fifth support member 5 is moved to the fifth unlocked position. As shown in FIG. 5, the tenth stop portion 704 is located in the fifth relief notch 5051, the ninth stop portion 505 abuts against the sixth support body 601, and the first support member 1, the second support member 2, the third support member 3, the fourth support member 4, the fifth support member 5 and the sixth support member 6 rotate forwards by a sixth preset angle as a whole around the seventh support member 7. Finally, the folding of at least part of the foldable display screen is completed.

Accordingly, when the foldable display screen is in a final state (state shown in FIG. 5) and the foldable display screen needs to be unfolded, first, the first support member 1, the second support member 2, the third support member 3, the fourth support member 4, the fifth support member 5 and the sixth support member 6 rotate reversely by the sixth preset angle as a whole around the seventh support member 7, and the tenth stop portion 704 is pulled out of the fifth relief notch 5051. Then, the first support member 1, the second support member 2, the third support member 3, the fourth support member 4 and the fifth support member 5 rotate reversely by the fifth preset angle as a whole around the sixth support member 6, and the eighth stop portion 604 is pulled out of the fourth relief notch 4051.

Subsequently, the first support member 1, the second support member 2, the third support member 3 and the fourth support member 4 rotate reversely by the fourth preset angle as a whole around the fifth support member 5. The sixth stop portion 504 is pulled out of the third relief notch 3051. The first support member 1, the second support member 2 and the third support member 3 rotate reversely by the third preset angle as a whole around the fourth support member 4, and the fourth stop portion 403 is pulled out of the second relief notch 2041.

Then, the first support member 1 and the second support member 2 rotate reversely by the second preset angle as a whole around the third support member 3, and the second stop portion 304 is pulled out of the first relief notch 1031. The first support member 1 rotates reversely by the first preset angle relative to the second support member 2. Finally, the unfolding of the foldable display screen is completed.

The support assembly 100 of the embodiments of the present disclosure has characteristics of a simple structure, performance reliability and the like with low manufacturing difficulty. Further, its unique interlocking structure solves the complex form of multi-plate linkage, and has great advantages in manufacturing difficulty and space, which can meet the folding requirements of non-standard foldable screens, so as to be well adapted to various models.

The terminal device of the embodiments of the present disclosure includes a display panel and a support assembly, at least a part of the display panel is arranged on the support assembly, and the support assembly is the support assembly 100 described in any one of the above embodiments.

Thus, the terminal device of the embodiments of the present disclosure has the advantages of a thin thickness, a light weight and the like.

In the descriptions of the embodiments of the present disclosure, it is to be understood that, terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "circumferential" should be construed to refer to the orientation or position as shown in the accompanying drawings. These relative terms are merely for convenience of descriptions and do not indicate or imply that the device or element referred to should have a particular orientation, or should be constructed or operated in a particular orientation, and thus cannot be construed as a limit to the present disclosure.

In addition, terms such as "first" and "second" are used herein for purposes of description and are not intended to indicate or imply relative importance or significance or to imply the number of indicated technical features. Thus, the feature defined by "first" and "second" may comprise one or more of this feature. In the description of the present invention, "a plurality of" means two or more than two, unless specified otherwise.

In the present disclosure, it should be noted that, unless specified otherwise, terms "mounted", "coupled", "connected" and "fixed" should be understood broadly, for example, may be fixed connections, detachable connections, or integral connections; may also be mechanical or electrical connections or intercommunications; may also be direct connections or indirect connections via intervening structures; may also be inner communications or interactions of two elements, which may be understood by those skilled in the related art according to specific situations.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "over", "above" and "on" the second feature may be that the first feature is directly above or obliquely above the second feature, or merely be that the first feature has a level higher than the second feature. The first feature "beneath", "below" and "under" the second feature may be that the first feature is directly below or obliquely below the second feature, or merely be that the first feature has a level less than the second feature.

Reference throughout this specification to terms "an embodiment", "some embodiments", "an example", "a specific example" or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A support assembly, comprising:
a first support member;
a second support member having a first side and a second side, the first support member being rotatably arranged to the first side of the second support member; and
a third support member rotatably arranged to the second side of the second support member,
wherein the first support member is movable between a first locked position and a first unlocked position,
the first support member is configured to rotate relative to the second support member, and the second support member and the third support member are configured to be fixed relative to each other when the first support member is in the first locked position, and
the second support member is configured to rotate relative to the third support member when the first support member is in the first unlocked position,
wherein the first support member and the second support member are configured to be fixed relative to each other when the first support member is in the first unlocked position.

2. The support assembly according to claim 1, further comprising a fourth support member rotatably arranged to a side of the third support member away from the second support member, wherein the third support member and the fourth support member are configured to be fixed relative to each other when the first support member is in the first locked position,
> wherein the second support member is movable between a second locked position and a second unlocked position,
>
> the first support member is configured to be in the first unlocked position, and the third support member and the fourth support member are configured to be fixed relative to each other when the second support member is in the second locked position,
>
> the third support member is configured to rotate relative to the fourth support member when the second support member is in the second unlocked position.

3. The support assembly according to claim 2, wherein the first support member comprises a first support body and a first fitting portion arranged on the first support body, the second support member comprises a second support body and a second fitting portion arranged on the second support body, and the second fitting portion is rotatably arranged to the first fitting portion to allow the first support member to be rotatably arranged to the second support member; and
> the second support member comprises a second support body and a third fitting portion arranged on the second support body, the third support member comprises a third support body and a fourth fitting portion arranged on the third support body, and the fourth fitting portion is rotatably arranged to the third fitting portion to allow the third support member to be rotatably arranged to the second support member.

4. The support assembly according to claim 3, wherein the first fitting portion overhangs an edge of the first support body along a direction towards the second support body, and the second fitting portion overhangs an edge of the second support body along a direction towards the first support body; and
> the third fitting portion overhangs an edge of the second support body along a direction towards the third support body, and the fourth fitting portion overhangs an edge of the third support body along a direction towards the second support body.

5. The support assembly according to claim 4, wherein one of the first fitting portion and the second fitting portion is a first sliding block, the other one of the first fitting portion and the second fitting portion is a first sliding piece, the first sliding block is provided with a first sliding slot having an opening facing the first sliding piece, and a part of the first sliding piece is slidably arranged in the first sliding slot along an arrangement direction of the first support body and the second support body through the opening of the first sliding slot; and
> one of the third fitting portion and the fourth fitting portion is a second sliding block, the other one of the third fitting portion and the fourth fitting portion is a second sliding piece, the second sliding block is provided with a second sliding slot having an opening facing the second sliding piece, and a part of the second sliding piece is slidably arranged in the second sliding slot along an arrangement direction of the second support body and the third support body through the opening of the second sliding slot.

6. The support assembly according to claim 5, wherein the third support member comprises a fifth fitting portion arranged on the third support body, the fourth support member comprises a fourth support body and a sixth fitting portion arranged on the fourth support body, and the sixth fitting portion is rotatably arranged to the fifth fitting portion to allow the fourth support member to be rotatably arranged to the third support member.

7. The support assembly according to claim 6, wherein the fifth fitting portion overhangs an edge of the third support body along a direction towards the fourth support body, and the sixth fitting portion overhangs an edge of the fourth support body along a direction towards the third support body.

8. The support assembly according to claim 7, wherein one of the fifth fitting portion and the sixth fitting portion is a third sliding block, the other one of the fifth fitting portion and the sixth fitting portion is a third sliding piece, the third sliding block is provided with a third sliding slot having an opening facing the third sliding piece, and a part of the third sliding piece is slidably arranged in the third sliding slot along an arrangement direction of the third support body and the fourth support body through the opening of the third sliding slot.

9. The support assembly according to claim 8, wherein the first support member comprises a first stop portion arranged on the first support body, and the third support member comprises a second stop portion arranged on the third support body,
> the first stop portion and the second support member are configured to be spaced apart from each other to allow the first support member to rotate relative to the second support member, and one of the first stop portion and the second stop portion is configured to abut against the other one of the first stop portion and the second stop portion to allow the second support member and the third support member to be fixed relative to each other, when the first support member is in the first locked position,
>
> the second stop portion is configured to disengage from the first stop portion to allow the second support member to rotate relative to the third support member, when the first support member is in the first unlocked position.

10. The support assembly according to claim 9, wherein the first stop portion overhangs an edge of the first support body along a direction towards the third support body, and the second stop portion overhangs an edge of the third support body along a direction towards the first support body.

11. The support assembly according to claim 10, wherein one of the first stop portion and the second stop portion is a first stop piece, the first stop piece is provided with a first relief notch, and the other one of the first stop portion and the second stop portion is a first stop block,
> the first stop block is configured to abut against the first stop piece when the first support member is in the first locked position,
>
> the first stop block is configured to be located in the first relief notch to allow the second stop portion to disengage from the first stop portion, when the first support member is in the first unlocked position.

12. The support assembly according to claim 9, wherein the second support member comprises a third stop portion arranged on the second support body, and the fourth support member comprises a fourth stop portion arranged on the fourth support body,
> the third stop portion and the third support member are configured to be spaced apart from each other to allow the second support member to rotate relative to the third support member, and one of the third stop portion and the fourth stop portion is configured to abut against the other one of the third stop portion and the fourth stop portion to allow the third support member and the fourth support member to be fixed relative to each other, when the second support member is in the second locked position, the fourth stop portion is configured to disengage from the third stop portion to allow the third support member to rotate relative to the fourth support member when the second support member is in the second unlocked position.

13. The support assembly according to claim 12, wherein the third stop portion overhangs an edge of the second support body along a direction towards the fourth support body, and the fourth stop portion overhangs an edge of the fourth support body along a direction towards the second support body.

14. The support assembly according to claim 13, wherein one of the third stop portion and the fourth stop portion is a second stop piece, the second stop piece is provided with a second relief notch, and the other one of the third stop portion and the fourth stop portion is a second stop block, the second stop block is configured to abut against the second stop piece when the second support member is in the second locked position, the second stop block is configured to be located in the second relief notch to allow the fourth stop portion to disengage from the third stop portion, when the second support member is in the second unlocked position.

15. The support assembly according to claim 14, wherein the third fitting portion is the second sliding piece, the third stop portion is the second stop piece, and the second sliding piece is provided with the second stop piece, the second sliding piece comprises a fitting section and a stop section connected with each other, a part of the fitting section is slidably arranged in the second sliding slot along the arrangement direction of the second support body and the third support body, and the second relief notch is formed in the stop section, the second stop block is configured to abut against the stop section when the second support member is in the second locked position.

16. The support assembly according to claim 15, wherein the first support body, the second support body, the third support body and the fourth support body are arranged along a width direction of the first support body, the first fitting portion and the first stop portion are spaced apart from each other along a length direction of the first support body, and the third fitting portion is located between the first fitting portion and the first stop portion in the length direction of the first support body; and the sixth fitting portion and the first stop portion are spaced apart from each other along the length direction of the first support body, and the third fitting portion is located between the sixth fitting portion and the first stop portion in the length direction of the first support body.

17. The support assembly according to claim 16, wherein the second stop portion is arranged on the fourth fitting portion, and the second stop portion overhangs an edge of the fourth fitting portion along the length direction of the first support body.

18. The support assembly according to claim 16, wherein the fourth stop portion is arranged on the sixth fitting portion, and the fourth stop portion overhangs an edge of the sixth fitting portion along the length direction of the first support body.

19. A foldable display screen, comprising:
a display panel; and
a support assembly, at least a part of the display panel being arranged on the support assembly, the support assembly comprising:
a first support member;
a second support member having a first side and a second side, the first support member being rotatably arranged to the first side of the second support member; and
a third support member rotatably arranged to the second side of the second support member,
wherein the first support member is movable between a first locked position and a first unlocked position,
the first support member is configured to rotate relative to the second support member, and the second support member and the third support member are configured to be fixed relative to each other when the first support member is in the first locked position, and
the second support member is configured to rotate relative to the third support member when the first support member is in the first unlocked position,
wherein the first support member and the second support member are configured to be fixed relative to each other when the first support member is in the first unlocked position.

20. A terminal device, comprising:
a housing; and
a foldable display screen arranged to the housing, the foldable display screen comprising:
a display panel; and
a support assembly, at least a part of the display panel being arranged on the support assembly, the support assembly comprising:
a first support member;
a second support member having a first side and a second side, the first support member being rotatably arranged to the first side of the second support member; and
a third support member rotatably arranged to the second side of the second support member,
wherein the first support member is movable between a first locked position and a first unlocked position,
the first support member is configured to rotate relative to the second support member, and the second support member and the third support member are configured to be fixed relative to each other when the first support member is in the first locked position, and
the second support member is configured to rotate relative to the third support member when the first support member is in the first unlocked position,
wherein the first support member and the second support member are configured to be fixed relative to each other when the first support member is in the first unlocked position.

* * * * *